April 1, 1924. 1,488,943

M. C. SCHWEINERT

DUST CAP

Filed April 8, 1921

Inventor
Maximilian Charles Schweinert,
By Attorneys

Patented Apr. 1, 1924.

1,488,943

UNITED STATES PATENT OFFICE.

MAXIMILIAN CHARLES SCHWEINERT, OF NEW YORK, N. Y.

DUST CAP.

Application filed April 8, 1921. Serial No. 459,667.

*To all whom it may concern:*

Be it known that I, MAXIMILIAN CHARLES SCHWEINERT, a citizen of the United States of America, residing in the borough of Manhattan, city, county, and State of New York, have invented certain new and useful Improvements in Dust Caps, of which the following is a specification.

This invention relates to dust caps for tire valves or the like, and aims to provide certain improvements therein.

The invention is particularly directed to that type of cap which has a longitudinally sliding nut adapted to screw partly on the top of the valve, the cap proper being adjusted inwardly until its foot portion contacts with the wheel felloe or rim nut.

According to the present invention I provide an improved form of cap in which there is a frictional engagement between the nut and the cap proper, which will securely hold the parts in their adjusted positions, and in which there is an adequate non-rotative connection between the nut and cap proper by means of which the nut may be screwed on and off the valve casing by manipulation of the valve cap.

Referring to the drawings which illustrate one form of the invention,—

Figure 1:
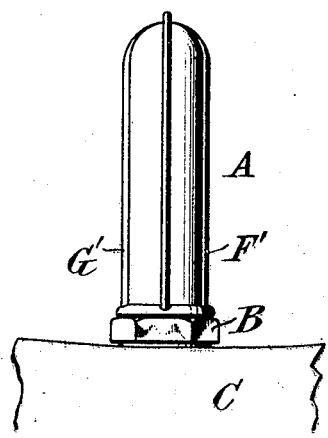
Figure 1 is an elevation of the cap shown as attached to a valve.
Figure 2:
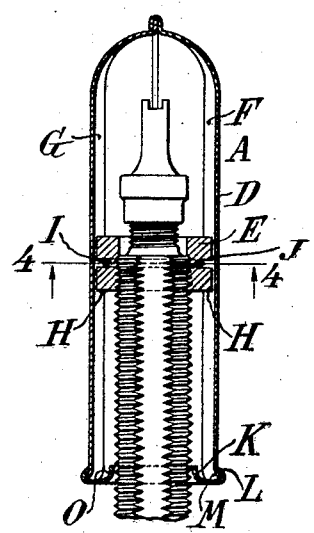
Fig. 2 is a diametrical section of the cap on an enlarged scale.
Figure 3:
Fig. 3 is a view of the friction ring.
Figure 4:
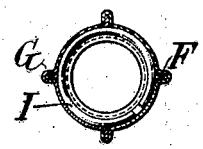
Fig. 4 is a cross-section on the line 4—4 in Fig. 2.
Figure 5:
Fig. 5 is a top view of the nut.

Referring to the drawings, let A indicate the cap as a whole, B the rim nut, and C the wheel felloe.

The cap A comprises essentially a cap proper D and a nut E, the nut being adapted to slide longitudinally within the cap and being held against relative rotation with reference to the cap.

In the construction shown I prefer to employ a cap proper having oppositely disposed grooves F, G, and for cheapness forming the cap of sheet metal, the grooves being constructed by beading the metal outwardly as shown at F', G' in Fig. 1. By preference the construction of the cap proper follows that set forth in the patent to Henry P. Kraft, No. 1,315,778. In the construction of this patent beads similar to F', G' are formed, for the purpose, however, of providing finger holds and to produce a more symmetrical appearance of the cap. According to the present invention I utilize the interior portions of these beads as a guide-way for the nut E in which projections H on the nut may slide to secure a non-rotative connection at any point which the nut may assume with reference to the cap proper.

Figure 6:
Fig. 6 is a side elevation of the nut showing the friction ring in place.

I also provide a cheap and simple frictional connection between the cap proper and the nut, this connection comprising a split ring I, or an analogous member, which is shown as held between shoulders in the nut formed by a groove J. As will be seen from Fig. 6, the groove is best continued around the nut and through the projections H.

This construction provides an adequate frictional connection between the parts so that when the nut is screwed down on the top of the valve casing (or it may be the valve nipple) the cap may be adjusted inwardly until its end contacts with the rim nut B, whereupon the frictional grip between the nut and cap will hold the cap in its inwardly adjusted position.

My invention also includes a lower guide K for the cap which is of approximately the same internal diameter as the external diameter of the casing, so that the cap is not liable to tilt. Such guide K is shown as formed of sheet metal having a flange L which is spun or crimped over the lower end of the cap proper as shown at M.

The guide K is also preferably provided with a tapered flange O which facilitates the passage of the guide over the top of the valve casing.

When the cap is formed in two longitudinal sections, as illustrated in the aforesaid patent, the guide K also constitutes a reinforcing member arranged at the bottom of the cap which tends to oppose any separation of the cap sections.

While I have shown and described a certain embodiment of the invention, it is understood that I do not wish to be limited thereto, as various changes may be made therein without departing from the spirit of the invention.

What I claim is:—

1. A dust cap for tire valves or the like comprising a cap portion, having an internal groove and a nut having a projection entering said groove, the parts being constructed to permit the nut to slide along the groove and to prevent relative rotary motion between the nut and cap portion.

2. A dust cap for tire valves or the like comprising a cap portion, having an internal groove and a nut having a projection entering said grove, the parts being constructed to permit the nut to slide along the groove and to prevent relative rotary motion between the nut and cap portion, said cap portion being formed of sheet metal and said groove being formed by pressing the metal outwardly to provide an exterior bead.

3. A dust cap for tire valves or the like comprising a portion formed in two longitudinal sections, each section having an outwardly pressed bead forming an interior groove, and a nut having projections entering said grove, the parts being constructed to permit the nut to slide longitudinally within the cap portion, and to prevent relative rotary motion between the nut and cap portion.

4. A dust cap for tire valves or the like having oppositely disposed internal grooves and a nut having projections sliding along said grooves, and frictional means for yieldingly holding the nut in various positions within said cap portions.

5. A dust cap for tire valves or the like comprising a cap portion and a nut and frictional means for holding said nut in various longitudinal positions within the cap portion, said frictional means comprising a split ring connected with the nut.

6. A dust cap for tire valves or the like comprising a cap portion and a nut and frictional means for holding said nut in various longitudinal positions within the cap portion, said frictional means comprising a split ring connected with the nut, the nut having a groove for receiving the ring.

7. A dust cap for tire valves or the like comprising a cap portion having a guiding member at the lower end thereof for facilitating the application of the cap to a tire valve casing and means within the cap above the guiding member for securing the cap upon such valve casing.

8. A dust cap for tire valves or the like comprising a cap portion having a sliding nut within it and the cap portion having at its lower end a guiding means for facilitating the application of the cap to the tire valve casing.

9. A dust cap for tire valves having a cap portion and a nut sliding therein, and a sheet metal collar having a tapered flange for facilitating the application of the cap to a tire valve casing.

10. A dust cap for tire valves constructed of longitudinal sections and having at its bottom a collar connected to the exterior thereof, such collar having a tapered guiding portion for the valve casing.

11. A dust cap for tire valves or the like, comprising a cap portion, a nut adapted to slide along the interior of the cap portion, and frictional means connected with the nut for yieldingly holding the latter in various longitudinal positions within the cap portion.

In witness whereof, I have hereunto signed my name.

MAXIMILIAN CHARLES SCHWEINERT.